May 20, 1969 R. J. HENNELLS 3,445,103
HYDRAULIC AND PNEUMATIC SHOCK ABSORBER AND SPRING DEVICE
Filed Sept. 7, 1966 Sheet 3 of 3

INVENTOR
RANSOM J. HENNELLS
BY
Woodhams, Blanchard & Flynn
ATTORNEYS

United States Patent Office 3,445,103
Patented May 20, 1969

3,445,103
HYDRAULIC AND PNEUMATIC SHOCK
ABSORBER AND SPRING DEVICE
Ransom J. Hennells, Plymouth, Mich., assignor to W. E.
Hennells Company, Inc., Belleville, Mich., a corporation of Michigan
Filed Sept. 7, 1966, Ser. No. 577,651
Int. Cl. B60g 11/26; F16f 3/00, 5/00
U.S. Cl. 267—64                                    14 Claims

ABSTRACT OF THE DISCLOSURE

A distortable shock absorber having a housing containing a hollow plunger slideable therein, the housing and plunger defining first and second fluid chambers. Valve means positioned between the first and second fluid chambers provide for flow of fluid from one chamber to the other chamber at a restricted rate in response to the distortion of the shock absorber. The valve means further includes means responsive to the distortion of the shock absorber for reducing the opening of the valve and means responsive to a pressure drop from the other chamber to the one chamber for urging the valve open. The shock absorber also includes a third chamber containing means for urging fluid from said other chamber to said one chamber upon release of the distortion forces to return the shock absorber to its undistorted condition.

---

This invention relates to a shock absorber and more particularly relates to a hydropneumatic shock absorber having a continuously increasing retarding force.

The particular shock absorber embodying the invention was developed for limiting motion of reciprocating carriages of the type used in carrying materials in industrial plants.

Hydropneumatic shock absorbers for such usage are known in which a piston is reciprocable along a cylinder pierced by axially spaced orifices. Oil located ahead of the piston is forced thereby through the orifices at a rate related to the number of orifices through which oil can flow. The restriction of oil escape is increased as the piston moves along the cylinder and covers successive ones of the openings. Increasing restriction of oil flow from the cylinder provides increasing retardation of forward movement of the piston.

The prior device is disadvantageous in that the retarding force on the advancing piston increases in a discontinuous manner, that is, in a series of abrupt steps. More particularly, the retarding force on the piston remains substantially constant while the piston is between openings and then jumps suddenly through a detectable step as the piston moves past and seals another one of the holes. Moreover, the step-like change in retarding force becomes more apparent as the piston moves toward the end of its travel in that fewer and fewer holes remain and coverage of each succeeding one thereof provides a proportionally larger step in the resistance to oil discharge from the cylinder.

Accordingly, the objects of this invention include:

(1) To provide a hydropneumatic shock absorber having a continuously increasing retarding force.

(2) To provide a shock absorber, as aforesaid, which provides a smoothly and continuously increasing resistance to compression as compression thereof increases.

(3) To provide a shock absorber, as aforesaid, in at least one embodiment of which the resistance to compression is controlled by a relatively small and light spring, the force of which is substantially negligible in comparison to the resistive force of the shock absorber.

(4) To provide a shock absorber, as aforesaid, which utilizes air under a relatively low pressure as a restoring medium for returning the shock absorber to its rest position after the shock absorber is released.

(5) To provide a shock absorber, as aforesaid, in which a preselected initial force must be exerted on the shock absorber before yielding thereof begins.

(6) To provide a shock absorber, as aforesaid, which is relatively simple in construction, which can be manufactured at relatively low cost, in which the elements controlling hydraulic fluid flow therewithin are of simplified construction and which may be quickly and easily assembled.

(7) To provide a shock absorber, as aforesaid, which is easily maintained by persons acquainted with shock absorbers in general and which is capable of a long service life under adverse conditions with little or no maintenance.

(8) To provide a shock absorber, as aforesaid, particularly intended for use as a cushioning stop device for heavily laden reciprocating materials handling carriages.

(9) To provide a shock absorber, as aforesaid, which in at least one embodiment is capable of providing either an increasing retarding force or a constant retarding force during the initial portion of the compression thereof, which provides a gradually increasing retarding force during the intermediate portion of the compression thereof and which is adjustable to stop contraction of the apparatus before its normal completion or alternatively to allow completion of the last phase of contraction at a reduced speed and a relatively high resistive pressure.

(10) To provide a shock absorber, as aforesaid, including in at least one embodiment means manually adjustable for determining the rate of collapse of the apparatus during the latter part of its stroke and further including means manually adjustable for determining the rate of change of force with respect to contraction during the initial portion of the contraction stroke, the first-mentioned means being manually adjustable for changing the restoring force of the shock absorber in its contracted position such change being the same for all compressive positions.

Other objects and purposes of this invention will be apparent to persons acquainted with apparatus of this general type upon reading the following specification and inspecting the accompanying drawings.

Certain terminology will be used in the following description for convenience in reference only and will not be limiting. The words "upwardly," "downwardly," "rightwardly" and "leftwardly" will refer to directions in the drawings to which reference is made. The words "inwardly" and "outwardly" will refer to directions toward and away from, respectively, the geometric center of the device and designated parts thereof. Said terminology

GENERAL DESCRIPTION

In general, the objects and purposes of this invention are met by providing a shock absorber having a hollow housing closed at one end and a hollow plunger provided with means for snugly supporting same for reciprocation within the housing. The plunger has a closed end which is extendable from the housing. A piston has portions snugly and slideably supported within the housing and within the plunger and, further, has a central opening extending therethrough. An elongated core has an enlarged head at one end thereof located within the central opening in the piston and a portion extending therefrom toward the closed end of said housing. The core and the piston are arranged for relative axial movement therebetween. Valve means are associated with the core and are located within the central opening in the piston. A first hydraulic chamber is defined within the plunger between the closed end thereof and the valve means and a second hydraulic chamber is defined within the housing between the piston and the closed end of the housing. The valve means is responsive to the axial location of the plunger in the housing for controlling fluid flow from the first hydraulic chamber to the second hydraulic chamber, the valve means increasingly restricting fluid flow as the plunger moves into the housing. The valve means are further responsive to a pressure drop from the second hydraulic chamber to the first hydraulic chamber for allowing return of fluid flow. Means are provided in the housing between the piston and the end of the housing at which the plunger enters for urging the piston toward the closed end of the housing with a force directly related to the spacing of the piston from the closed end of the housing.

In a modified embodiment of the invention, means are provided for adding or subtracting precisely metered amounts of hydraulic fluid to the second hydraulic chamber to control the initial opening of the valve means.

DETAILED DESCRIPTION

Figures 1, 2:
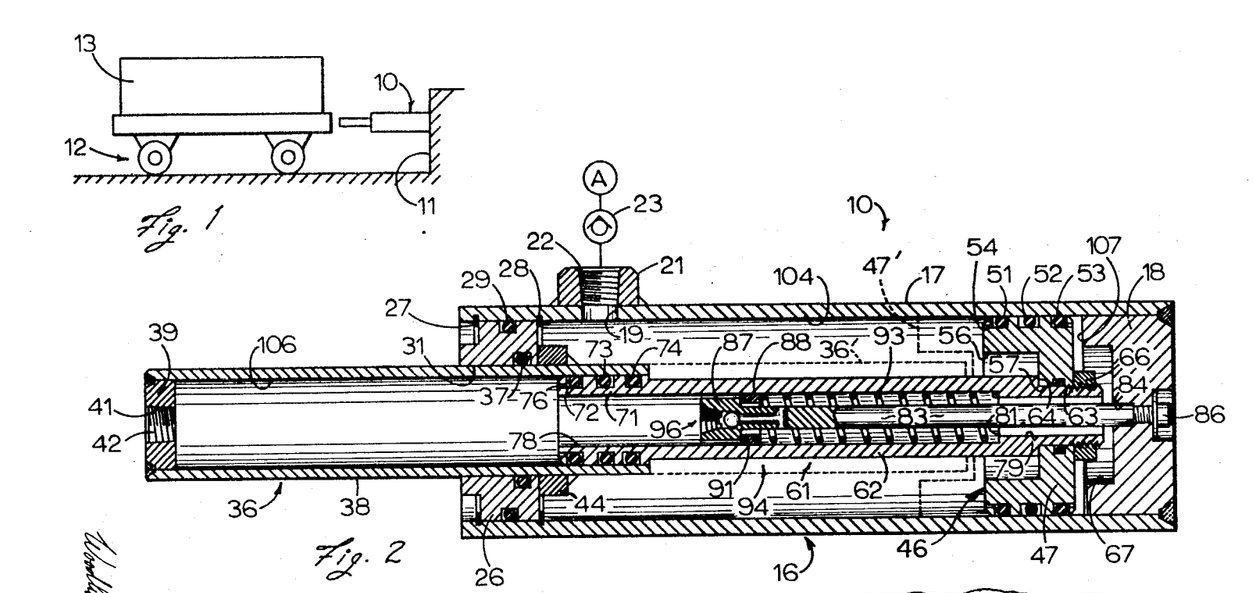
FIGURE 1 is a somewhat schematized view of the shock absorber embodying the invention installed in an illustrative position of use.
FIGURE 2 is a central cross-sectional view of the shock absorber embodying the invention.

Turning now to the drawings, FIGURE 1 discloses a shock absorber 10 embodying the invention, which to illustrate a preferred use for present invention is, fixed by any convenient means, not shown, to a stationary wall 11 for providing a shock absorbing stop for a rightwardly moving carriage 12 carrying a relatively heavy workpiece 13. Although FIGURE 1 illustrates the invention in a preferred situation of use, it will be recognized that at least in its broader aspects, the invention is not limited to such usage.

The shock absorber 10 (FIGURES 2 and 3) embodying the present invention comprises a substantially cylindrical housing 16 having an axially extending peripheral wall 17 and a closure member 18 secured therewithin as by welding to close the rightward end thereof. An opening 19 extends through the peripheral wall 17 of the housing 16 near the leftward end thereof. An annular boss 21 is secured as by welding to the exterior of the peripheral wall 17 coaxially of the opening 19 and is internally threaded as indicated at 22 for connection to a suitable source A of pressure fluid, preferably a compressible fluid such as air. If desired, a check valve 23 may be disposed between the source A of air and the shock absorber 10 for allowing free movement of air from the source to the shock absorber 10 but preventing return flow therefrom. It is contemplated that the source A may be of non-compressible fluid if provision is made between the shock absorber 10 and source A to relieve excessive pressure at the boss 21.

An annular guide 26 is snugly disposed within the housing 16 adjacent the leftward end thereof and is maintained axially fixed with respect thereto by means of snap rings 27 and 28. The guide 26 includes an exterior groove in which is disposed a suitable seal, preferably an O-ring 29, which bears against the interior surface of the peripheral wall 17 in a circumferentially continuous zone to prevent axial leakage past the annular guide 26 and the peripheral wall 17 of the housing. The guide 26 has a central opening 31.

A cylindrical hollow plunger 36 is snugly but slideably disposed in the central opening 31. Suitable seal means are disposed between the plunger 36 and the wall of the central opening 31 to prevent axial fluid of leakage therealong. In the particular embodiment shown, said seal means comprise an O-ring 37 disposed in an annular groove in the wall of the central opening 31 which bears resiliently and continuously against the plunger 36. The plunger 36 includes a cylindrical shell 38 the leftward end of which is closed by a plug 39 snugly inserted therewithin and fixed with respect thereto by any convenient means such as welding. The end wall 39 has an axially extended threaded central opening 41 therethrough. The central opening 41 is normally closed by a removable plug 42 which is removable therefrom for admitting a suitable inelastic fluid preferably a conventional hydraulic fluid such as oil into the plunger 36. The plug 42 when installed in the opening 41 preferably is recessed therewithin. The end wall 39 of the plunger 38 may be disposed for actuation by a suitable load such as the carriage 12 of FIGURE 1 whereas the rightward end of the housing 16 may be fixed by any convenient means, not shown, to a suitable support such as the wall 11 of FIGURE 1.

A stop ring 44 snugly surrounds the shell 38 at a point near to but spaced from the rightward end thereof and is secured thereto by any convenient means such as welding. Interference between the stop ring 44 and the inner radial face of the annular guide 26 prevents leftward movement of the plunger 36 from its position shown in FIGURE 2.

A piston 46 includes a generally cup-shaped head 47 which is snugly but reciprocably received within the peripheral wall 17 of the housing 16. Suitable seal means are provided between the periphery of the head 47 and the interior of the peripheral wall 17 which in the particular embodiment shown comprise three annular seals, preferably O-rings 51, 52 and 53, disposed in spaced integral grooves in the head 47 and bearing in sealing engagement on the interior of the peripheral wall 17. If desired, suitable pressure loading openings, one of which is indicated at 54 may be provided to connect the O-ring grooves through the adjacent surfaces of the piston to pressurize the inner sides of the O-rings and drive same firmly against the peripheral wall 17.

The piston head 47 is provided with a leftwardly opening, substantially cylindrical central recess 56. The diameter of the recess 56 is somewhat greater than that of the rightward end of the plunger 38 and the axial depth of said recess preferably of the same order of magnitude as the spacing of the stop ring 44 from the rightward end of the plunger 36. The piston 47 is provided with a central opening 57 which communicates between the rightward wall of the recess 56 and the rightward end of the piston head 47.

The piston 46 further includes a hollow rod 61 which is affixed to and extends coaxially leftwardly from the head 47. More particularly, the rod 61 has a generally cylindrical intermediate portion 52 and a rightward end portion 63 of reduced diameter, the portions 62 and 63 being connected by a radial step 64. The rightward end portion 63 is snugly received through the central opening 57 in the head 47 and is threaded at the rightward end thereof for receiving a nut 66. With the nut 66 tightened, the central portion of the head 47 adjacent the central opening 57 is snugly gripped between the nut 66 and step 64 for joining the hollow rod 61 rigidly to the piston head 47. The leftward end face of the closure member 18 is preferably recessed as indicated at 67 to accommodate the nut 66 and the threaded portion of the rightward end portion 63 when the piston 46 is in its rightwardmost position shown.

The leftward end portion 71 of the hollow rod 61 is preferably enlarged somewhat in diameter compared to the intermediate portion 62 and fits snugly but slideably within the rightward end of the shell 38. Suitable seal means are provided between the leftward end portion 71 and the surrounding portion of the shell 38 to prevent fluid leakage axially therebetween. In the particular embodiment shown, such seal means comprise three O-rings 72, 73 and 74 disposed in axially spaced annular grooves in the periphery of the leftward end portion 71. Also in the particular embodiment shown, suitable pressure loading openings 76 similar to the openings 54 above described are provided to maintain the O-rings 72, 73 and 74 firmly against the surface of the shell 38.

The hollow rod 61 has a central opening 78 therethrough. The central opening 78 is preferably of stepped cylindrical configuration having a portion of reduced diameter 79 at the rightward end thereof providing a leftwardly facing step 81 near the rightward end of the intermediate portion 62.

An elongated core 83 lies loosely within the central opening 78. The rightward end of the core 83 is rigidly affixed to the closure member 18 to maintain said core in coaxial alignment with the hollow rod 61. In the particular embodiment shown, the rightward end of the core 83 is snugly received within a pilot opening 84 in the center of the recess 67 and is internally threaded for receiving a screw 86, the head of which is recessed in the rightward end of the closure member 18. Thus, tightening of the screw 86 rigidly secures the core 83 with respect to the closure member 18.

The leftward end of the core 83 comprises a radially enlarged valve head 87 (FIGURES 2 and 3), the periphery of which is radially spaced from the wall of the central opening 78. The valve head 87 is located intermediate the ends of the central opening 78. The rightward face of the valve head 87 is preferably radial as indicated at 88 and is used as a valve seat as hereinafter indicated.

Figure 3:
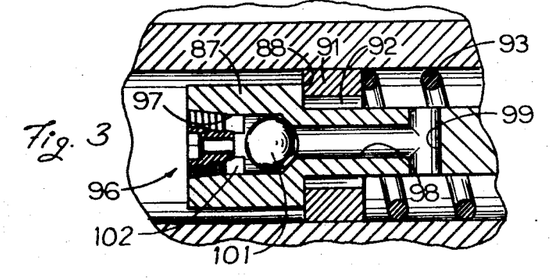
FIGURE 3 is an enlarged, partially broken fragment of FIGURE 2.

An annular collar 91, preferably of rectangular central section as seen in FIGURE 3, is snugly but slideably received within the central opening 78 adjacent and to the right of the valve head 87. The collar 91 coaxially surrounds and is radially spaced from the core 83 to define a restrictive annular passage therebetween. The collar 91 is urged leftwardly into circumferential continuous contact with the valve seat 88 by a helical compression spring 93 which extends radially from the collar 91 to the step 81. The seat 88, collar 91 and spring 93 together comprise a flow control valve generally indicated by the reference numeral 94. Leakage through the interface between the collar 91 and the wall of the central opening 78 is prevented by the snug fit therebetween. If desired, the collar 91 may be made of a resilient material to minimize leakage through the flow control valve 94.

A check valve 96 is disposed in the head 87. More particularly, the check valve 96 includes a ball recess 97 which is provided in the leftward end of the head 87. A coaxial opening 98 extends rightwardly from the ball recess 97 along the core 83 to a point to the right of the collar 94. A diametral opening 99 in the core 83 communicates with the opening 98 for allowing flow of fluid around the flow control valve 94 from the rightward portion of the central opening 78 to the leftward portion thereof. A ball 101 is disposed in the ball recess 97 with sufficient clearance to allow fluid passage therearound and an axially perforated plug 102 is threaded into the leftward end of the ball recess 97 for loosely constraining the ball 101 against movement out of the recess. The plug 102 maintains the ball 101 sufficiently close to the opening 98 that a pressure drop from the leftward side of the ball to the rightward side thereof will cause the ball to seat against the end of the opening 98 to prevent rightward fluid flow through the valve 96.

An annular pneumatic chamber 104 is defined axially between the piston 47 and the guide 26 and radially between the peripheral wall 17 and the hollow rod 61. A hydraulic chamber 106 is defined within the plunger 36 and within the central opening 78 to the left of the valves 96 and 94. A further hydraulic chamber 107 is defined within the peripheral wall 17 axially between the piston head 47 and closure member 18. Thus, the central opening 78 to the right of the valves 96 and 94 comprises a passage connecting the hydraulic chambers 106 and 107 when either of said valves is open.

OPERATION

Although the operation of the shock absorber 10 embodying the invention has been indicated somewhat above, same will be briefly summarized hereinbelow to insure a complete understanding of the invention.

With the shock absorber 10 in its extended rest position shown in FIGURE 2, the chambers 106 and 107 as well as the central opening 78 are normally filled with hydraulic fluid or any other suitable inelastic fluid. The pneumatic chamber 104 is preferably filled with an elastic fluid, for example, air, under pressure, generally relatively low, from the source A. A pressure of about 10 pounds per square inch has, for example, been found satisfactory in certain applications. Under such conditions, the piston head 47 is forced by the air pressure in the chamber 104 rightwardly to its rightward limiting position shown in FIGURE 2 in which it is preferably leftwardly spaced somewhat from the closure member 18. As a result, the hydraulic fluid in the chamber 107 is maintained through the piston head 47 under a relatively low minimum pressure established by the air pressure in the chamber 104. Since the check valve 96 opens under a pressure drop from the chamber 107 to the chamber 106, the chamber 106 will be at least at and normally will be exactly at the pressure of the chamber 107.

Should a rightward force now be imposed upon the extended plunger 36, as for example, due to abutment of the carriage 12 of FIGURE 1 thereagainst, the condition of the shock absorber 10 will not change while the force exerted on the plunger 36 remains below that required to increase the pressure in the chamber 106 sufficiently to displace the collar 91 rightwardly from the seat 88, that is, to cause an initial compression of the spring 93. In the preferred embodiment of the invention, the spring 93 exerts a nonzero leftward force on the collar 91 when the shock absorber 10 is in its extended rest position shown. Thus, a nonzero force is required to displace the collar 91 from the seat 88.

It will be noted that the area of the leftward face of the collar 91 exposed to the chamber 106 is very small compared to the cross-sectional area of said chamber. As a result, the pressure generated in chamber 106 in response to exertion of a relatively large rightward force on the plunger 36 will result in a substantially smaller rightward force on the collar 91, the rightward forces imposed on the plunger and collar being in the ratio of the cross-sectional area of the chamber 106 and area of the collar 91 exposed thereto. This enables a relatively weak spring force to maintain the valve 94 closed in the face of relatively large rightward force on the plunger 36.

After the rightward force on the plunger 36 has increased sufficiently to open the flow control valve 94, hydraulic fluid is forced from the chamber 106 through the restrictive annular passage 92 and thence rightwardly along the central opening 98 to the chamber 107. Upon opening of the valve 94, the exposed rightward face area of the collar 91 increases somewhat, thereby increasing the rightward force thereon somewhat and allowing the collar 91 to assume a position spaced somewhat from the seat 88. The spacing of the opened collar 91 from the seat 88 as well as the cross section of the restrictive passage 92 are relatively small for slowing and controlling the rate of fluid flow therethrough and, hence, for controlling the rate at which the plunger 36 can move rightwardly in response to a given force thereon.

As the plunger 36 moves rightwardly by expelling fluid from the chamber 106 into the chamber 107, the piston 46 is moved leftwardly by the hydraulic fluid thus forced into the chamber 107. Movement of the piston head 47 leftwardly causes a corresponding leftward movement of the hollow rod, the rate at which the plunger 36 telescopes over the hollow rod 61 thus being the sum of the rate of rightward movement of said plunger and the rate of leftward movement of the piston head 47. Due to the substantially larger cross section of the chamber 107 than on the chamber 106, the movement of the piston head 47 leftwardly is substantially slower than the movement of the plunger 36 rightwardly.

Leftward movement of the rod 61 results in a corresponding leftward movement of the step 81 thereon and, hence, of the rightward end of the spring 93. Thus, the closing force of the spring 93 on the flow control valve 94 increases as a function of the leftward movement of the hollow rod 61 and therefore, as a function of the retraction of the plunger 36 into the valve housing 16. Consequently, the pressure required within the chamber 106 to maintain the valve 94 open, i.e., the rightward force required on the plunger 36 to effect further contraction of the shock absorber 10, rises as the plunger moves rightwardly into the housing 16 due to the increase in the spring force. Thus, if desired, the shock absorber 10 can, by judicious selection of the spring constant and initial compression of the spring 93, be made to resist without complete contraction forces which are large multiples of that required to initiate rightward movement of the plunger 36. Moreover, it will be noted that the force required to effect further retraction of the shock absorber rises continuously and smoothly as the shock absorber is compressed and rises at a rate proportional to the rightward movement of the plunger 36.

Given a rightward force of sufficient magnitude, the plunger 36 may be moved rightwardly to its rightward limiting position indicated in broken lines at 36' in which position at the leftward end of the plunger is flush with the leftward face of the guide 26 and the preferably coplanar end of the peripheral wall 17. The corresponding leftward limiting position of the piston head 47 is indicated in broken lines at 47'. With the plunger 36 and piston head 47 in their limiting positions so indicated, the rightward end of the plunger 36 is received partially into the recess 56 in the piston head 47.

Should a check valve such as the check valve 23 be installed between the source A of air and the chamber 104, the pressure within the chamber 104 will rise by a small percentage amount as the piston head 47 moves leftwardly and plunger 36 moves rightwardly. However, the volume of the chamber 104 is only fractionally diminished when the piston head 47 and plunger 36 assume their limiting positions 47' and 36', respectively, so the corresponding pressure rise therein is correspondingly small. On the other hand, the check valve 23 may be omitted in which case, depending on the character of the source A, the pressure in the chamber 104 may or may not rise above the initial value imposed thereon by the source A. Operation of the shock absorber is not materially effected whether the pressure in the chamber 104 is maintained constant or allowed to rise slightly as a result of movement of the piston head and plunger.

Upon release of the rightward force on the plunger 36, the pressure in the chamber 106 tends to drop to atmospheric pressure. However, upon drop of the pressure in the chamber 106 below that of the chamber 107, the latter being of the same order of magnitude as the air pressure in the chamber 104, the check valve 96 opens and hydraulic fluid flows from the chamber 107 back to the chamber 106. Consequently, the air pressure in the chamber 104 urges the piston head 47 rightwardly to its rightward limiting position of the drawing of FIGURE 2 and hydraulic fluid is thus moved out of the chamber 107 past the check valve 96 and into the chamber 106 to return the plunger 36 to its leftwardmost position shown in FIGURE 2. Thus, the pressure in the chamber 104 acts to return the shock absorber 10 to its extended, rest position of FIGURE 2.

The spring 93 is readily replaceable should it be desired, for example, to increase or decrease the initial force required to begin compression of the shock absorber 10 and/or to change the rate at which the applied force required to further compress the shock absorber relates to the position of the plunger 36 in the housing 16. For example, release of the snap ring 27 allows the guide 26 together with the plunger 36 to be removed from the hollow rod 61. Release of the screw 86 then allows the core 83, collar 88, spring 93 to be removed from the now open leftward end of the hollow rod 61. Reassembly of the shock absorber 10 may be accomplished by simple reversal of the above steps. Prior to disassembly, release of the plug 42 allows hydraulic fluid to be drained from the shock absorber 10.

MODIFICATIONS

Figure 4:
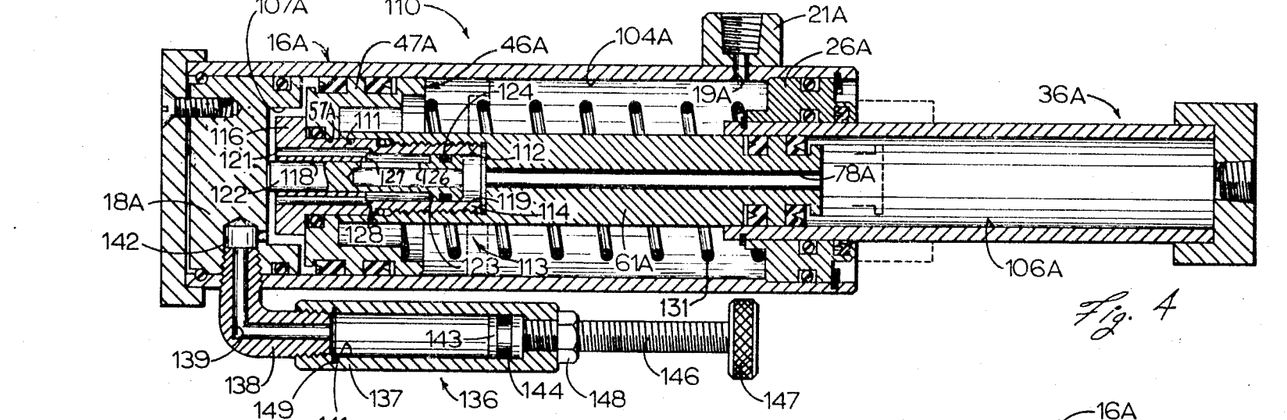
FIGURE 4 is a central cross-sectional view of a modified shock absorber embodying the invention.
Figure 5:
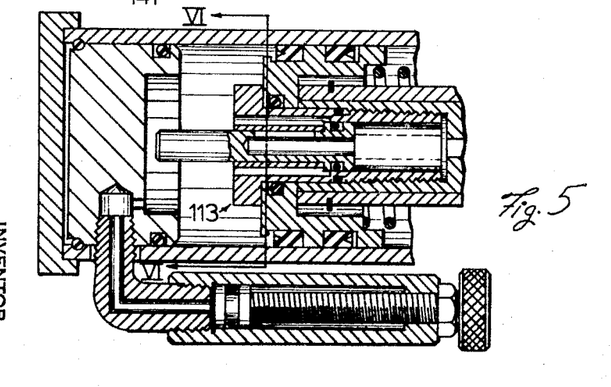
FIGURE 5 is a fragment of FIGURE 4 showing the parts thereof in different positions of operation.
Figure 6:
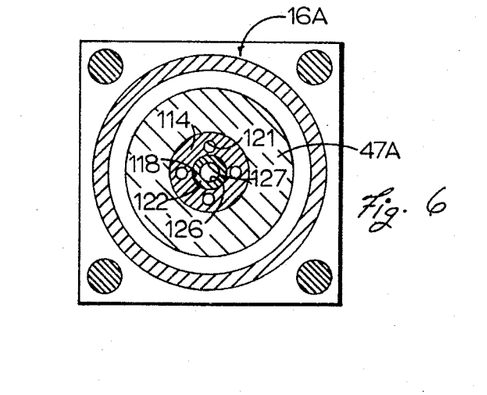
FIGURE 6 is a sectional view taken on the line VI—VI of FIGURE 5.

FIGURES 4 through 6 disclose a modified embodiment of the invention. The modified shock absorber 110 has many parts substantially similar to corresponding parts of the shock absorber 10 described hereinabove. These parts of the shock absorber 110 will carry the same reference numerals as the corresponding parts of the shock absorber 10 with the suffix A added thereto. Thus, the shock absorber 110 (FIGURE 4) is provided with a housing 16A, a hollow plunger 36A extending from one end of the housing 16A, (here the rightward end), a piston 46A having a piston head 47A slideably arranged within the housing 16A and an elongated hollow piston rod 61A extending rightwardly from the piston head 47A into snug but sliding contact with the interior of the plunger 36A.

The modified shock absorber 110 differs from the shock absorber 10 above described however in that the core 83 and valves 94 and 96, above described with respect to the shock absorber 10, are no longer present in the modified shock absorber 110 and are replaced by means hereinafter described. The detailed construction of the attachment of the rod 61A to the piston head 47A also differs somewhat from that described hereinabove with respect to the shock absorber 10, again as hereinafter described.

Turning now to the detailed description of the modified portions of the shock absorber 110, the central opening 78A extending through the hollow piston rod 61A is relatively small in diameter. A leftwardly opening and axially elongated recess 111 is centrally located in the piston rod 61A and communicates with the central opening 78A. The rightward end 112 of the central recess 111 is threaded.

A valve assembly generally indicated at 113 includes a plug 114 insertable into the recess 111 and threadedly engageable with the threaded end 112 thereof. The plug 114 is provided with a radial flange 116 at the leftward end thereof, said plug extending through the central opening 57A in the piston head 47A. Thus, the flange 116 and the leftward end of the piston rod 61A firmly grip the piston head 47A therebetween and are arranged in coaxial alignment therewith. The plug 114 has a central opening 118 therethrough, the rightward end of which is enlarged radially to form an elongated cylindrical valve chamber 119 opening through the rightward end of the plug 114. A plurality, here four, of axially extending passages 121 are preferably evenly spaced circumferentially around the leftward end of the central opening 118 in radially spaced relation thereto. The passages 121 communicate between the leftward end of the valve chamber 119 and the hydraulic chamber 107A.

The valve assembly 113 further includes an elongated cylindrical core 122 snugly but slideably arranged for reciprocation in the central opening 118, the leftward end of the core 122 normally extending into the hydraulic chamber 107A and the rightward end of the core being disposed in the valve chamber 119. The core 122 includes a radially extending head 123 at its rightward end which snugly but slideably engages the peripheral wall of the valve chamber 119, the length of the head 123 being substantially less than the length of the valve chamber 119 to permit a substantial axial movement of the core 122 in the plug 114. A seal, preferably an O-ring 124, is provided in an annular groove in the periphery of the head 123 for preventing fluid flow along the periphery of the valve chamber 119 therepast. A coaxial bore 126 opens from the rightward end of the core 122 and extends leftwardly to a point intermediate the ends thereof. The length of the bore 126 preferably corresponds substantially to the length of the valve chamber 119.

A circumferentially narrow but axially elongated slot 127 opens radially through the periphery of the core 122 and communicates between the central opening 126 and the portion of the chamber 119 to the left of the head 123. The distance from the leftward end of the slot 127 to the leftward end of the core 122 preferably is substantially equal to the length of central opening 118 between the valve chamber 119 and the hydraulic chamber 107A. The slot 127 is thus arranged so that with the core 122 near the rightward end of the valve chamber 119 as shown in FIGURE 4, the major portion of the slot 127 is fully exposed to the leftward end of the chamber 119. Therefore, as the piston head 47A and plug 114 move rightwardly with respect to the core 122 as hereinafter described, the peripheral wall of the central opening 118 will gradually cover the slot 127, such wall and slot thus forming a continuously closeable valve 128. The rightward end of the slot 127 is preferably spaced somewhat from the head 123 so that the slot will be completely removed from the chamber 119 before the head 123 strikes the leftward end of the chamber 119.

In the particular embodiment shown in FIGURE 4, a spiral compression spring 131 is disposed in the chamber 104A loosely between the piston rod 61A and the peripheral wall of the housing 16A, such spring bearing at its ends on the piston head 47A and on the annular guide 26A at the open end of the housing for urging the piston 46A leftwardly. The opening 19A and boss 21A serve, in the particular embodiment shown, to vent the air chamber 104A to the atmosphere to maintain same at atmospheric pressure despite movement of the piston 46A. The spiral compression spring 131 of FIGURE 4 and the compressed air entrapped in the pneumatic chamber 104 of FIGURE 2 serve the same function, that is, to effect extension of the shock absorber when the load is removed therefrom and to provide a preferably gradually increasing retarding force on the piston as it is urged away from the closed end of the housing by filling of the hydraulic chamber 107 or 107A. It will therefore be apparent that the spiral spring 131 may be used in the apparatus of FIGURE 2 in place of the air spring by disconnecting the valve 23 and air source A and allowing the opening 19 to vent to the atmosphere as in FIGURE 4. It will also be apparent that the spiral spring 131 may be removed from the shock absorber 110 of FIGURE 4 and by coupling an air source and check valve corresponding to air source A and check valve 23 of FIGURE 2 to the boss 21A, compressed air may be supplied to the chamber 104A for use as an air spring in the manner discussed hereinabove with respect to the embodiment of FIGURE 2.

FIGURE 4 discloses a further modification which comprises a hydraulic fluid storage unit generally indicated at 136. The storage unit 136 comprises an elongated, relatively small diameter casing 137 which in the particular embodiment shown lies adjacent to and parallels the housing 16A. A preferably conventional elbow fitting 138 threads into the leftward end of the casing 137. The other end of the fitting 138 threads radially into the end closure member 18A. A passage 139 extends the length of the fitting 138 and communicates between the storage chamber 141 defined within the casing 137 and a further passage 142 disposed in the end wall 18A and communicating with the hydraulic chamber 107A. A piston 143 is snugly but slideably disposed within the storage chamber 141 for axial movement therealong. The piston carries a suitable peripheral groove in which is disposed a conventional seal, for example, an O-ring 144, for preventing leakage axially along the storage chamber past the piston. A screw 146 is threadable coaxially through the rightward end of the casing 137 and is preferably integrally connected to the rightward end of the piston 143 whereby the piston reciprocates in response to threading of the screw along the casing 137. The screw 146 is provided with a manually engageable grip 147 and a lock nut 148 engageable with the rightward end of the casing 137 to prevent unintended resetting of the screw 146. In the particular embodiment shown, a snap ring 149 is provided adjacent the leftward end of the storage chamber for preventing movement of the piston 143 therepast.

The operation of the shock absorber 110 is generally similar to that of the shock absorber 10 above discussed with the exceptions noted below. First, the operation of the valve assembly 113 differs from that of the valves 94 and 96 of the absorber 10. More particularly, considering the absorber 110 in its normal rest position shown in FIGURE 4, application of a compressive force thereto as by striking the end of the plunger 36A with a moving cart 12, as indicated in FIGURE 1, tends to move hydraulic fluid from the plunger 36A into the chamber 107A through the bore 126, slot 127 and passages 121. Because the slot 127 is relatively narrow, it restricts flow of hydraulic fluid therethrough and causes a pressure drop from the chamber 106A in the plunger to the chamber 107A. An increase in the rate of flow through the slot 127 results in an increase in the pressure drop thereacross. Thus, in the normal working range of flow rates through the valve structure 113 i.e., in the normal range of initial compressive forces exerted on the shock absorber 110, there is, as is the case in the shock absorber 10, a substantial pressure drop across the valve. However, at extremely low rates of flow, approaching zero, the pressure drop across the slot 127 will drop to a low value, approaching zero. In this respect, the shock absorber 110 differs from the shock absorber 10 described above in that for the latter a spring 93 can be selected which will maintain an initial closing force on the valve 94 so that a nonzero pressure drop would be required across the valve 94 before it would open and before any flow would take place. Given a spring 93 having only a very light initial closing force on the valve 94, the pressure drops across the valves 94 and 128 of the two shock absorbers can be made substantially the same for a wide range of flow rates and, hence, for a wide range of compression forces.

As compression of the shock absorber 110 continues, the plunger moves leftwardly and the piston 46A moves rightwardly, but at a substantially slower rate, toward their broken line positions indicated in FIGURE 4. The pressure drop across the head 123 of the core 122, due to the pressure drop across the slot 127, urges the core leftwardly to make contact of the leftward end thereof with the end wall 18A of the housing 16A. Thus, as the valve chamber 119 moves rightwardly with the piston, the length of the slot 127 in communication with the valve chamber 119 gradually lessens. As a result, the rate of flow through the slot 127 diminishes and, hence, the rate of collapse of the shock absorber diminishes unless the compressive force thereon is continuously increased. Thus, as was the case in the shock absorber 10 described hereinabove, a continuously increasing force is necessary to compress the shock absorber 110 at a constant rate. As the shock absorber 110 approaches its condition of full collapse, the reduced diameter portion of the central opening 118 will completely cover the slot 127 so that flow therethrough is brought substantially to a halt. The leftward end of the core 122 preferably fits in the central opening 137 tightly enough that leakage past the interface of the core 122 and central opening 118 is relatively small even at very high compressive pressures. Thus, rapid collapse of the absorber 110 stops when the valve 128 closes. The shock absorber of FIGURE 2 does not close its valve 94 positively as the end of the compressive stroke is reached and differs in this respect from the shock absorber 110.

Upon release of the compressive force on the shock absorber 110, the pressure in the rightward chamber 106A drops to atmospheric pressure and the spring 131 urges the piston 47A leftwardly to pressurize the chamber 107A at a value above atmospheric pressure. The resulting pressure drop across the head 123 of the valve core 122 moves same rightwardly with respect to the valve housing 47A sufficiently to place at least a part of the slot 127 in communication with the valve chamber 119 and, hence, with the hydraulic chamber 107A. This allows hydraulic fluid to flow from the chamber 107A through the slot 127 and into the chamber 106A, thus causing the plunger to move rightwardly toward its fully extended position indicated in solid lines in FIGURE 4 and allowing the piston head 47A to move leftwardly toward its solid line position of FIGURE 4. As the piston head 47A moves leftwardly, the valve core 122, if not already contacting the housing end, will be carried by the piston until the core strikes the end 18A of the housing. Thereafter, further movement of the piston head causes a further opening of the slot 127 until the shock absorber 110 reaches its rest position shown.

Should it be desired to decrease the initial opening of the slot 127 and thus increase the initial compressive force required for a given rate of collapse from the extended rest position, the maximum opening of the slot 127 may be reduced. This is achieved in the particular embodiment shown by shifting the rest position of the piston 46A rightwardly with respect to the housing 16A, the initial pressure in the chamber 106A during initial compression of the shock absorber causing the core 122 to remain in contact with the closed end of the housing 16A so that the length of the slot 127 exposed to the valve chamber 119 is reduced. Such preshifting of the piston 46A is carried out by means of the storage unit 136. More particularly, release of the lock nut 148 and manual threading of the screw 146 to the left moves the piston 143 toward the fitting 138 and drives hydraulic fluid stored in the unit 136 through the fitting 138 and into the hydraulic chamber 107A to force the piston 46A rightwardly. In the particular embodiment shown, a full leftward movement of the screw 146 to its position shown in FIGURE 5 will shift the piston 47A sufficiently that the uncovered portion of the slot 127 will be reduced by about 13%. It is fully contemplated, however, that by changing the volume of the chamber 141 in the unit 136 or by only partially shifting piston 143, the change in the initial effective length of the slot 127 can be varied. It should further be pointed out that the compressive force on the shock absorber required to maintain a fixed fluid flow rate through the valve 128 continues to increase as the shock absorber 110 collapses generally as hereinabove described with the storage chamber 137 filled but at a higher instantaneous level. The effect, then of preshifting the piston 46A rightwardly, is not only an increase in initial resistance to compression by the shock absorber but in addition a corresponding increase in the resistance to compression at every stage of its retraction. Moreover, complete closure of the slot 127 occurs sooner in the compression stroke so that retraction of the shock absorber stops before complete collapse or the last portion of collapse must be carried out at a relatively high pressure and low velocity controlled by the extent of leakage from the closed slot 127. Thus, the shock absorber 110 has the distinct advantage that its resistance to compression may be adjusted without disassembly thereof and, in fact, may be adjusted while the unit is in use, if desired, merely by adjusting the screw 146. Further, the precision with which the resistance to compression is extremely fine and an entire rotation of the screw 146 causes an extremely small percentage adjustment of the length of the slot 127 exposed to fluid flow between the chambers 106A and 107A.

In the particular embodiment shown, the shock absorber 110 is arranged to submit to a maximum compressive load of 12,000 pounds with a maximum cycling rate of 1500 cycles per hour but it will be seen that with variations in the dimensions, such specifications can be changed over a wide range. When the spring 131 is relatively strong, it adds to the resistance of the shock absorber to collapse at a rate which increases gradually with the position of retraction of the plunger. Moreover, when a relatively strong spring is used, the maximum cycling rate will increase since after release of the load, the shock absorber will extend at a greater rate. In addition, the pressure drop across the valve core will increase and may increase to the point where the core is shifted during expansion of the shock absorber completely to the rightward end of chamber 119 without contacting the closed end of the housing 16A. In this event, the plunger will pass through an initial, very short inward movement in response to a relatively low compressive force thereon, the movement of fluid from the chamber 106A resulting therefrom going to move the core 122 leftwardly into contact with leftward end of the housing. After this relatively short distance of free movement, collapsing movement continues as above described. This initial period of free movement of the plunger is lengthened slightly when oil is injected into the chamber 107A from the storage unit 136 since the core 122 must travel further to strike the closed housing end.

Although a continued compressive force of large magnitude on the shock absorber will cause further but slow collapse of the shock absorber 110 after the slot 127 is no longer in direct communication with the valve chamber 119 due to leakage, so that the plunger can move slowly to a position in which it seats against the rightward end of the housing, collapse of the shock absorber will normally come to a halt short of such position and when the slot 127 closes. Thus, no mechanical shock occurs as a result of the capped rightward end of the plunger striking the rightward end of the housing.

It is contemplated that the storage unit 136 may be added to the absorber 10 of FIGURE 2, if desired, for preshifting the piston 46 leftwardly and thereby increasing the valve closing force of spring 93 by an amount depending on the magnitudes of said shift and of the spring constant of spring 93. Thus, the instantaneous closing force on the valve 94 would thereby be adjustable on a continuous basis at any time, even when the absorber 10 is in operation.

Figure 7:
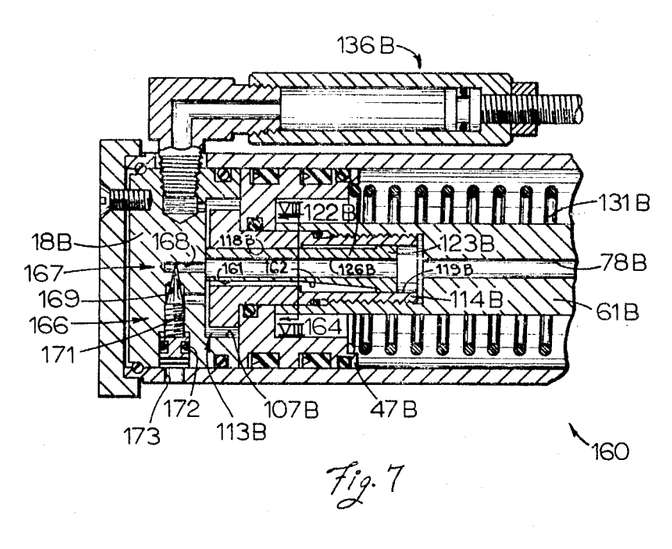
FIGURE 7 is a fragment of FIGURE 5 showing a further modification.
Figure 8:
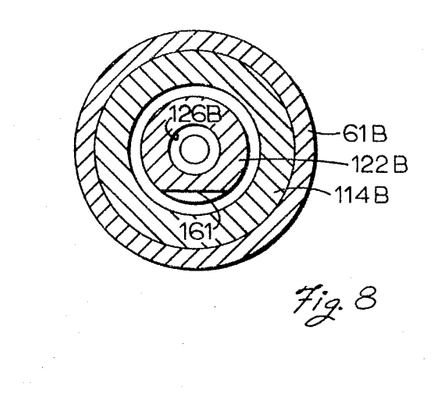
FIGURE 8 is an enlarged sectional view taken on the line VIII—VIII of FIGURE 7.

FIGURES 7 and 8 show a still further modification which is essentially similar to that disclosed in FIGURES 4 through 6 above described. Thus, portions of the apparatus of FIGURES 7 and 8 corresponding to parts of the apparatus of FIGURES 4 through 6 will be referred to by the same reference numerals thereas with the suffix B added thereto.

The modified shock absorber 160 of FIGURE 7 differs from that of FIGURES 4 through 6 in that the openings 121 of the valve assembly 113 are not present in the plug 114B of valve assembly 113B shown in FIGURE 7. Further, the opening 126B extends axially through the core 122B and no slot corresponding to the slot 127 shown in FIGURE 4 is provided. Further, the head 123B is loosely disposed in the valve chamber 119B to allow relatively free fluid flow axially therebetween. The core 122B is, in addition, provided with a chordal flat 161 which extends axially along the periphery thereof from the leftward end thereof to an intermediate point thereon. The rightward end of the flat defines a tapered flat portion 162 sloped radially outwardly to a point on the periphery of the core adjacent the head 123B. The leftward end of the core 122B is, as in the case of the apparatus of FIGURE 4, snugly but slideably engaged in the central opening 118B of the plug 114B, the valve chamber 119B and central opening 118B being separated by a radial step 164.

The apparatus 160 differs further from the apparatus 110 of FIGURE 4 in providing a needle valve generally indicated at 166 in the end member 18B of the casing. A generally U-shaped passage 167 in the end member 18B communicates with the hydraulic diameter 107B, has one leg 168 coaxially aligned with the bore 126B in the core 114B and a further, preferably parallel leg radially offset therefrom and from the core 114B. The bight portion of the passage 167 includes a valve seat 169 engageable by the pointed end of the needle member 171 of the needle valve 166. The needle member 171 is threaded radially into the end member 18B and is accessible through an opening 173 preferably of lesser diameter in the side wall of the casing for adjustment. The outer end of the needle member is provided with an O-ring to prevent escape of hydraulic fluid radially outwardly therepast. Thus, the needle valve 166 controls hydraulic fluid flow through the core into the leftward hydraulic chamber 107B.

Considering the operation of the shock absorber 160, the apparatus is assumed to be initially in its rest or extended condition of FIGURES 7 and 8, with the hydraulic fluid storage unit 136B filled with hydraulic fluid as shown. The initial portion of the compression stroke, for example, the first half inch to an inch thereof, results in a small rightward movement of the piston head 47B due to transfer of oil from the rightward or plunger hydraulic chamber, not shown, corresponding to the chamber 106A of FIGURE 4, to the leftward hydraulic chamber 107B through the valve chamber 119B and central opening 118B along the flat 161. This rightward movement of the piston head 47B moves the step 164 inside the plug 114B rightwardly along the flat 161 to the beginning of the tapered portion 162 thereof. During this initial contraction, ratio of the compressive force exerted on the shock absorber 160 to its rate of contraction is substantially constant since the hydraulic fluid path cross section between the step 164 and flat 161 remains substantially unchanged. It will be noted that the high pressure hydraulic fluid in passage 78B exerts, as in the absorber 110 of FIGURE 4, a leftward force on the core 122B maintaining same snugly against the end wall 18B with sufficient force as to prevent direct fluid flow between the leftward hydraulic chamber 107B and the interior of the core 122B.

As the shock absorber 160 continues to contract, the piston head 47B and plug 114B advance rightwardly moving the step 164 rightwardly along the tapered portion 162 of the flat 161 so as to gradually diminish the cross section of the opening bounded thereby. Therefore, the rate of hydraulic fluid flow to the chamber 107B will gradually decrease as a linear function of shock absorber contraction. When the plug 114B is moved sufficiently rightwardly to bring the step to the rightward end of the tapered portion 162, fluid can no longer flow along the outside of the core 114B and contraction of the shock absorber 160 stops before the plunger corresponding to plunger 36A of FIGURE 4 is fully retracted. Such plunger may thus still have an inch or so of possible retraction at this point.

Should the compressive load remain exerted upon the apparatus 160, the apparatus will, if the needle valve 166 is closed, hold its partially retracted condition for extended periods of time. Alternatively, by opening the needle valve 166, the absorber 160 will move at a relatively slow rate to complete contraction under a sustained compressive load, the rate of contraction being directly controlled by the degree of opening of the needle valve 166. Thus, the needle valve 166 acts as a bypass between the core central opening 126B and the leftward hydraulic chamber 107B when fluid cannot flow along the flat 161 or radially directly past the leftward end of the core 114B. It will be noted that if the needle valve is opened sufficiently during the intermediate portion of the stroke of the shock absorber it will partially bypass the normal fluid path between the tapered portion 162 of the flat 161 and the step 164 so that hydraulic fluid reaches the leftward hydraulic chamber 107B at an increased rate for a given compressive load. Thus, the open needle valve 166 lowers the contraction retarding force of the shock absorber 160 at any given point of contraction. By adjusting the needle valve 166, the shock absorber 160 can be made to contract at essentially the same rate for a light load as for a heavy load, i.e., can be made less stiff for light loads and more stiff for heavy loads by opening and closing, respectively, the needle valve.

As in the apparatus for FIGURE 4 a release of the compressive load on the shock absorber 160 allows the spring 131B to return the piston head 47B leftwardly and thereby drive oil from the leftward hydraulic chamber 107B into the passage 78B. More particularly, the oil in the leftward hydraulic chamber 107B forces the core 122B rightwardly with respect to the piston head and away from the end wall 18B thus moving the flat 161 into spaced opposition to the step 164. This allows free fluid flow both through the interior of the core 122B and along the flat 161.

The auxiliary hydraulic supply 136B acts in a somewhat different way on the apparatus 160 of FIGURE 7 than on the apparatus 110 of FIGURE 4. More particularly, emptying the supply 136B into the leftward hydraulic chamber 107B shifts the piston head 47B rightwardly and, when the absorber 10 is in its rest position shown, thereby moves the step 164 rightwardly into opposition with the tapered portion 162 of the flat 161. Thus, as a compressive load is placed on the shock absorber and contraction thereof begins, the compressive force-contraction rate ratio immediately begins to increase gradually with contraction. Thus, the shock absorber no longer exerts a substantially constant retarding pressure during the initial portion of the contraction stroke. Further, with the supply 136B emptied into the leftward chamber 107B, the absorber 160 contracts less before the step 164 moves rightwardly past the tapered portion 162 and shuts off fluid flow therebetween.

Although the invention has been described above in terms of a compressive shock absorber, it will be recognized that at least in its broader aspects the invention is contemplated as being capable of practice on tensile shock absorbing devices as well.

The embodiments of the invention in which an exclusive property or privilege is claimed are defined as follows:

1. A distortionable shock absorber, comprising:
   a hollow housing closed at one end thereof;
   a hollow plunger having a closed end and means for snugly supporting said plunger for reciprocation within said housing, the closed end of said plunger being extendable from said housing;
   a piston having a central opening therein and a portion thereof snugly and slideably supported within said housing;
   valve means associated with said central opening in said piston;
   a first hydraulic chamber defined within said hollow plunger between the closed end of said plunger and said valve means and a second hydraulic chamber defined within said housing between said piston and the closed end of said housing;
   said valve means controlling flow of fluid between said first and second hydraulic chambers, said valve means being responsive to axial movement of said plunger relative to said housing for controlling fluid flow from one of said first and second hydraulic chambers to the other of said first and second hydraulic chambers and responsive to a pressure drop from said other hydraulic chamber to said one hydraulic chamber for allowing fluid flow from said other hydraulic chamber to said one hydraulic chamber;

a third chamber defined between the portion of said piston slideably supported by said housing and said means supporting said plunger for reciprocation with respect to said housing, said third chamber including means for urging said piston to move in a direction toward the closed end of said housing for causing fluid flow from said second hydraulic chamber through said valve means to said first hydraulic chamber; and means for preventing direct communication between said first and third chambers.

2. A compressible hydropneumatic shock absorber, comprising in combination:
a hollow housing closed at one end thereof;
a hollow plunger having a closed end and means for snugly supporting said plunger for reciprocation within said housing, said closed end of said plunger being extendable from said housing;
a piston having a central opening therethrough and portions snugly and slidably supported within said housing and plunger;
a core disposed in said central opening of said piston for relative axial movement with respect thereto and extending toward said closed housing end;
valve means associated with said core within said central opening in said piston;
a first hydraulic chamber defined within said hollow plunger between said closed end of said plunger and said valve means and a second hydraulic chamber defined within said housing between said piston and said closed end of said housing;
said valve means being responsive to axial movement of said plunger in said housing for controlling fluid flow from said first hydraulic chamber to said second hydraulic chamber and responsive to a pressure drop from said second to said first hydraulic chamber for allowing fluid flow therebetween; and
a pneumatic chamber defined between the portion of said piston slideably supported by said housing and said means supporting said plunger for reciprocation with respect to said housing, said pneumatic chamber lying between said piston and said housing.

3. The device defined in claim 2, including means for introducing hydraulic fluid into one of said first and second hydraulic chambers and for removing hydraulic fluid therefrom, said means including a storage chamber and means adjustable for varying the volume thereof.

4. The device defined in claim 2, in which said central opening includes an enlarged valve chamber intermediate the ends therof;
said core extends between said valve chamber and said second hydraulic chamber and is provided with a radially enlarged head disposed in slideable but sealing engagement with the walls of said valve chamber;
said valve means comprises a central passage extending from the end of said core facing said first hydraulic chamber into said core past said head and communicating through an axially elongated slot in the wall of said core with said chamber on the side between said head and said second hydraulic chamber when said head is disposed adjacent the end of said valve chamber nearest said first hyraulic chamber, said valve means further including feed passages extending between said second hydraulic chamber and the adjacent end of said valve chamber, said feed passages being disposed eccentrically of said central opening, the end of said core adjacent said second hydraulic chamber being adapted to abut said closed one end of said housing to limit movement of said core theretoward during movement of said piston toward the closed end of said housing.

5. The device defined in claim 2, including means defining a hydraulic fluid storage chamber disposed in fixed relation adjacent said housing, means communicating between one end of said storage chamber and said second hydraulic chamber through said one end of said housing and a piston reciprocable along said storage chamber and disposed in snug sealing relationship with the periphery thereof and including a manually actuable screw fixed to said piston and extending outwardly of said storage chamber at the end thereof opposite that connected to the hydraulic chamber, said screw being actuable for forcing hydraulic fluid from said storage chamber into said second hydraulic chamber and, alternatively, for withdrawing hydraulic fluid from said second hydraulic chamber into said storage chamber.

6. The device defined in claim 2 in which said central opening includes an enlarged valve chamber intermediate the ends thereof;
said core extends along said central opening between said valve chamber and said second hydraulic chamber and is provided with a radially enlarged head loosely radially disposed in said valve chamber;
said valve means includes a depression in the periphery of said core extending axially from the end thereof opposite said head intermediate said end and said head, said depression sloping gradually radially outwardly toward said head at the end thereof adjacent said head, said opening and reduced portion defining therebetween a fluid passage, the cross-sectional area of which is reduced gradually at the end thereof adjacent said head, whereby fluid flow can take place between said hydraulic chambers through said passage when the depression in said core is at least partially in said valve chamber, fluid flow is reduced when only an element of said sloped portion of said depression communicates with the valve chamber and said fluid flow is shut off when the depression is outside of said valve chamber.

7. The device defined in claim 2 in which said core is hollow and defines a passage communicating between the portions of said central opening at opposite ends thereof, said core being adapted to extend beyond said piston into contact with said closed end of said housing; and including
a bypass opening in said closed end in communication with said second hydraulic chamber at a point spaced eccentrically from said core and communicating through the interior wall of said closed end at another point in coaxial alignment with said core and in communication with passage therethrough for providing communication between said hydraulic chambers when said valve means is closed and said core abuts against said closed end; and
a needle valve disposed in said bypass opening manually adjustable for varying or closing off fluid flow therethrough so as to vary the resistance to compression of the shock absorber.

8. The device defined in claim 2, in which said core is fixed to the closed end of said housing;
said valve means includes a first valve for controlling flow from said first hydraulic chamber comprising an enlarged head on the end of said core, a collar loosely disposed on said core in interfering relationship with said head, said collar being snugly but slideably arranged in said central opening, and a spring disposed between said collar and means fixed with respect to said piston rod intermediate the ends of said core, said collar being held by said spring against said head to close said first valve, movement of said plunger into said housing causing compression of said spring for increasing the closing force on said first valve; and said valve means further includes a second valve for controlling flow from said second hydraulic chamber.

9. The device defined in claim 8, in which said second valve includes a check valve including a ball disposed within a recess at the end of said core, an opening connecting said recess through the wall of said core at a point spaced therefrom, said ball being arranged for blocking said opening, and means disposed for retaining said ball in said recess, said ball being maintained against the end of said opening by a pressure drop from said first to said second hydraulic chamber.

10. A compressible shock absorber, comprising:
housing means having a bore therein with said housing means being closed at one end of said bore;
a hollow plunger having a closed end and defining a first chamber within the interior thereof, and means for snugly supporting said plunger for relative reciprocation within said housing means, the closed end of said plunger being extendable from the other end of said housing means, and the other end of said plunger extending into said bore;
a piston snugly and slideably supported by the walls of said bore for reciprocation of said piston relative to said housing means, said piston also being slideable relative to said plunger, said piston being in sealing engagement with the walls of said bore and dividing said bore into second and third chambers;
means defining a passageway for permitting communication between said first and second chambers;
means preventing said third chamber from communicating with either of said first or said second chambers;
valve means associated with said passageway for controlling fluid flow from one of said first and second chambers to the other of said first and second chambers, said valve means also including means for urging said valve means open for permitting flow from said other chamber to said one chamber in response to a pressure drop from said other chamber to said one chamber; and
means positioned within said third chamber for urging flow of fluid from said other chamber to said one chamber upon release of the distortion forces imposed on the shock absorber to return said shock absorber to its undistorted condition.

11. A distortable shock absorber according to claim 10, wherein said valve means also includes means responsive to the distortion of said shock absorber for further reducing the opening of said valve means and further restricting the flow of fluid from said one chamber to said other chamber.

12. A distortionable shock absorber according to claim 10, in which said valve means includes a flow control valve disposed in said passageway and comprising a fixed enlarged head mounted on a core and an annular collar snugly but slideably disposed in said passageway and loosely surrounding the core and spring means surrounding said core for urging said collar against said head, said flow control valve permitting fluid flow therethrough from said one chamber to said other chamber, and including means fixed with respect to said passageway for backing said spring and means for causing said backing means to move toward said head for increasing the force of the spring means on said collar in response to compression of said shock absorber, said valve means further including a passage formed in said head and a check valve positioned within said passage for permitting fluid flow therethrough from said other chamber to said one chamber.

13. The device defined in claim 10, in which said valve means includes means defining a valve chamber disposed between and in communication with said first and second hydraulic chambers at spaced locations therealong and further includes a valve core having a head disposed in said valve chamber, said core including a portion extending outwardly of said valve chamber in snug but slideable relationship with said means defining said valve chamber, said core having a passage therein extending from the end thereof facing said second hydraulic chamber past said head and opening through the periphery of said core between said head and said first hydraulic chamber and being located on said portion of said core arranged for slideable movement out of the chamber, whereby movement of said core away from said second hydraulic chamber effects closure of said core passage and thereby prevents communication between said first and second hydraulic chambers.

14. The device defined in claim 10 in which said valve means comprises means defining a valve chamber disposed between said first and second hydraulic chambers and an opening communicating between said valve chamber and said second hydraulic chamber, said valve chamber communicating with said first hydraulic chamber at a location spaced therealong from said opening, said valve means further including a hollow valve core having a head loosely disposed in said valve chamber and a portion extending outwardly of said valve chamber in snug but slideable relationship with said opening, a portion of the periphery of said core between the end of said core opposite said head and a point intermediate said end and said head being in radially spaced relation to the wall of said opening for allowing fluid flow from said valve chamber through said opening between said core portion and said opening wall when said core portion is at least partially in said valve chamber, said core portion being slideable into said opening to shut off fluid flow therepast between said first and second hydraulic chambers.

References Cited

UNITED STATES PATENTS

| 2,445,139 | 7/1948 | Gret. |
| 2,628,662 | 2/1953 | Morris et al. |
| 2,771,968 | 11/1956 | Mercier. |
| 2,916,281 | 12/1959 | Hehn. |
| 3,079,897 | 3/1963 | Kirsch. |
| 3,279,781 | 10/1966 | Rumsey. |

FOREIGN PATENTS

| 922,638 | 1/1947 | France. |

GEORGE E. A. HALVOSA, *Primary Examiner.*

U.S. Cl. X.R.

188—96, 100